United States Patent
Nonaka et al.

(10) Patent No.: US 8,848,738 B2
(45) Date of Patent: Sep. 30, 2014

(54) OPTICAL TRANSMISSION DEVICE AND OPTICAL TRANSMISSION METHOD

(75) Inventors: Ayumu Nonaka, Fukuoka (JP); Yuji Shimada, Fukuoka (JP); Syed Faruk Ahmed, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 806 days.

(21) Appl. No.: 12/972,571

(22) Filed: Dec. 20, 2010

(65) Prior Publication Data

US 2011/0150469 A1    Jun. 23, 2011

(30) Foreign Application Priority Data

Dec. 22, 2009    (JP) .................................. 2009-290989

(51) Int. Cl.
*H04J 14/00*    (2006.01)
*H04J 3/06*    (2006.01)
*H04J 3/16*    (2006.01)

(52) U.S. Cl.
CPC ....... *H04J 3/1652* (2013.01); *H04J 2203/0089* (2013.01); *H04J 3/062* (2013.01)
USPC ............................ 370/470; 370/503; 370/529

(58) Field of Classification Search
CPC .............. H04L 2209/20; H04L 1/0007–1/0008
USPC ......... 370/474, 470, 503, 529; 398/52, 82, 58
See application file for complete search history.

(56) References Cited

U.S. PATENT DOCUMENTS

| | | | |
|---|---|---|---|
| 2003/0099231 A1* | 5/2003 | Betts et al. ..................... | 370/369 |
| 2007/0076767 A1* | 4/2007 | Loprieno et al. .............. | 370/539 |
| 2008/0175236 A1* | 7/2008 | Lee et al. ....................... | 370/389 |
| 2009/0162061 A1* | 6/2009 | Kisaka et al. ................... | 398/52 |
| 2010/0067547 A1* | 3/2010 | Katagiri et al. ................ | 370/474 |

FOREIGN PATENT DOCUMENTS

| | | |
|---|---|---|
| JP | 2008-113394 A | 5/2008 |
| JP | 2008-113395 A | 5/2008 |

* cited by examiner

*Primary Examiner* — Andrew Chriss
*Assistant Examiner* — Romani Ohri
(74) *Attorney, Agent, or Firm* — Fujitsu Patent Center

(57) ABSTRACT

There is provided an optical transmission device which includes a determiner, a convertor, and a switch. The determiner determines whether a frame includes a fixed stuff byte area or not when the frame is received from a first network, where the frame includes a payload area for storing client data and the fixed stuff byte area is for storing fixed data. When the determiner determines that the frame includes the fixed stuff byte area, a convertor to convert a fixed stuff byte area into the payload area and a switch switches a clock frequency from a first clock frequency used in the first network to a second clock frequency used in a second network when the frame including the converted fixed stuff byte area is output to the second network on the basis of the clock frequency as a reference.

11 Claims, 11 Drawing Sheets

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2009-290989, filed on Dec. 22, 2009, the entire contents of which are incorporated herein by reference.

FIELD

The embodiments discussed herein are related to an optical transmission device and an optical transmission method.

BACKGROUND

In recent years, a variety of optical transmission systems has been studied in which client data output from client devices is transmitted in frames. Among these transmission systems, particularly the OTN (Optical Transport Network) system has been drawing attention. The OTN transparently transmits client data in the SONET (Synchronous Optical Network) format or the SDH (Synchronous Digital Hierarchy) format.

The OTN system stores client data in a frame called OTU (Optical channel Transport Unit) frame standardized by ITU-T (International Telecommunication Union-Telecommunication standardization sector). Specifically, the OTN system stores client data in a payload area included in the OTU frame.

An FS (Fixed Stuff) byte area for storing fixed data is inserted in the OTU frame in some cases to match the bit rate of the client data and the bit rate of the payload area. Insertion of the FS byte area into the OTU frame causes an actual data area of the payload area available for storing the client data to be reduced. Accordingly, the OTN system stores the client data in the data area reduced by the FS byte area.

The related art includes Japanese Laid-open Patent Publication Nos. 2008-113394 and 2008-113395.

SUMMARY

According to an aspect of the invention, an optical transmission device for receiving first data from a first network and transmitting second data corresponding to the first data to a second network includes a determiner configured to determine whether a frame includes a fixed stuff byte area or not when the frame is received from the first network, the frame including a payload area for storing client data, the fixed stuff byte area being for storing fixed data; a convertor configured to convert the fixed stuff byte area into the payload area when the determiner determines that the frame includes the fixed stuff byte area; a switch configured to switch a clock frequency from a first clock frequency used in the first network to a second clock frequency used in the second network when the frame including the converted fixed stuff byte area is output to the second network on the basis of the clock frequency as a reference.

The disclosed technique has been made to solve the above-described issue of the existing technique, and an object thereof is to provide an optical transmission device and an optical transmission method capable of creating, with a simple configuration, an optical communication network wherein a variety of transmission rates are available.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The above-described existing technique, however, has an issue of complication of a network configuration in the creation of an optical communication network wherein a variety of transmission rates is available. Specifically, according to the existing technique, transmission rates in some cases are different each other in an OTU frame having no FS byte area inserted therein and an OTU frame having an FS byte area inserted therein. According to the existing technique, if OTU frames are different in transmission rate, different optical transmission devices may be prepared for the respective OTU frames which are different in transmission rate. As a result, the existing technique tends to complicate the network configuration in the creation of an optical communication network performing a variety of transmission rates.

For example, when connecting networks having different transmission rates, the existing technique performs so-called back-to-back connection to connect two optical transmission devices which transmit OTU frames at mutually different transmission rates, and thus complicates the network configuration.

Embodiments of an optical transmission device and an optical transmission method according to the present invention will be described in detail below with reference to the drawings.

[First Embodiment]

Figure 1:
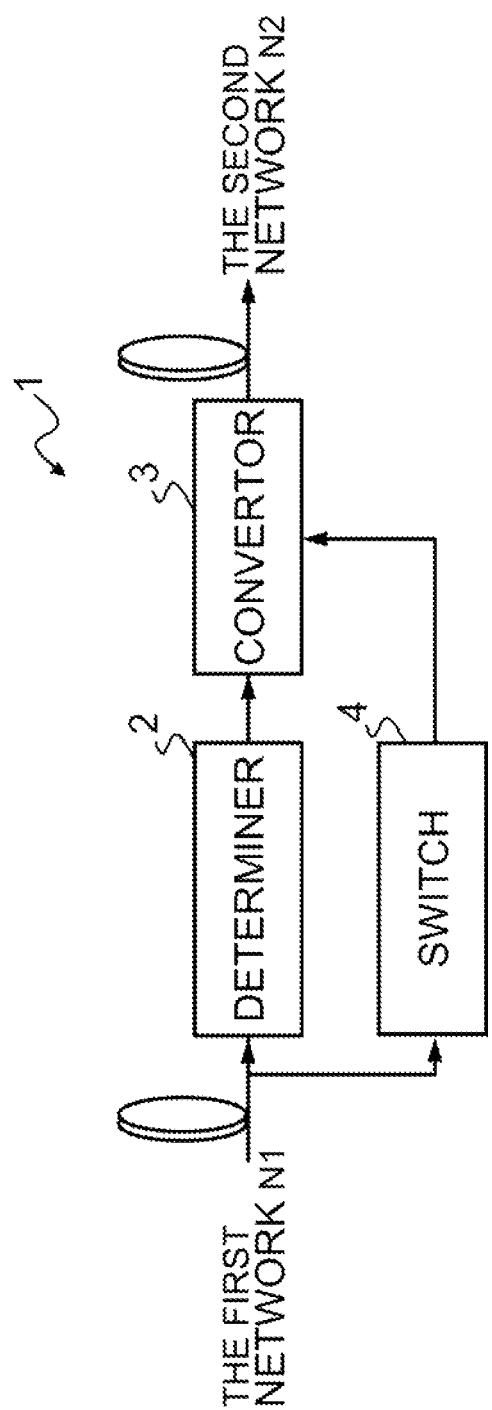
FIG. 1 is a block diagram illustrating a configuration of an optical transmission device according to a first embodiment.

A configuration of an optical transmission device according to a first embodiment will be first explained with FIG. 1 which illustrates a block diagram of a configuration of an optical transmission device 1 as the first embodiment. The optical transmission device 1 according to the first embodiment includes a determiner 2, a convertor 3, and a switch 4. The optical transmission device 1 according to the first embodiment is coupled to a first network N1 serving as an input-side network and to a second network N2 serving as an output-side network.

When a frame including a payload area for storing client data is input from the first network N1, the determiner 2 determines whether or not a fixed stuff byte area for storing fixed data is inserted in the frame. The frame is, for example, the OTU (Optical channel Transport Unit) frame standardized by ITU-T (International Telecommunication Union-Telecommunication standardization sector). Further, the fixed stuff byte area is an FS (Fixed Stuff) byte area for storing fixed data to match the bit rate of the client data and the bit rate of the payload area.

The convertor 3 converts the fixed stuff byte area determined by the determiner 2 as inserted in the frame into the payload area. The switch 4 switches a clock frequency used as a reference in the output of the frame including the payload area converted by the convertor 3 from a clock frequency corresponding to the first network N1 to a clock frequency corresponding to the second network N2.

As described above, the optical transmission device 1 according to the first embodiment converts the fixed stuff byte area inserted in the input frame into the payload area. Then, the optical transmission device 1 switches the clock frequency used as the reference in the output of the frame including the converted payload area from the clock frequency of the input-side network to the clock frequency of the output-side network. That is, the optical transmission device 1 is capable of converting the transmission rate of the frame between the input side and the output side. Thus, even in the connection between networks having different transmission rates, there is no need to connect two devices in back-to-back connection. Therefore, the optical transmission device 1 according to the first embodiment may create with a simple configuration an optical communication network wherein a variety of transmission rates is available.

[Second Embodiment]

Subsequently, the optical transmission device described in the above-described first embodiment will be described with reference to a specific example. In a second embodiment, description will be made with reference to an example using, as the optical transmission device, a regenerator device which relays data between different networks. Further, the optical transmission device according to the second embodiment is assumed to employ, as the transmission system, the OTN (Optical Transport Network) system which stores client data in the OTU frame standardized by ITU-T. Further, the OTU frame is assumed to include OTU2 and OTU3 frames. Further, in the following, the clock of the OTU frame and the clock of the client data are assumed to be synchronous with each other.

Figure 2A:
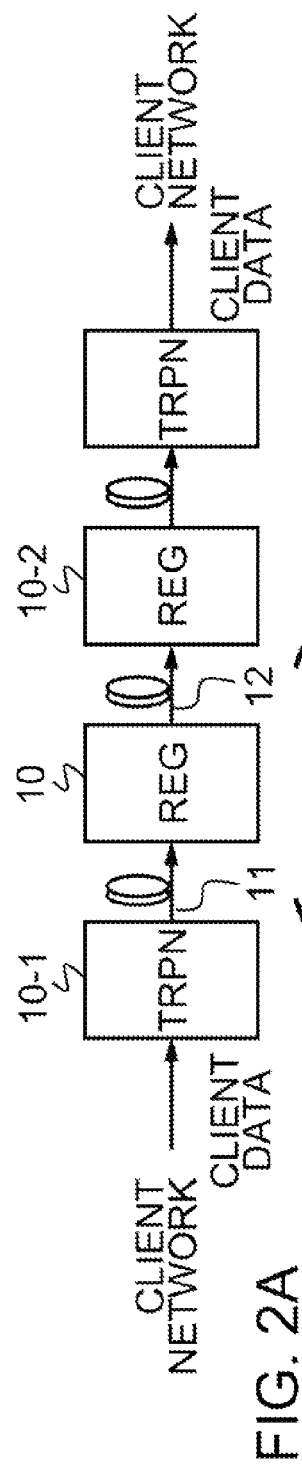
FIGS. 2A to 2C are diagrams for explaining an optical transmission method performed by an optical transmission device according to a second embodiment.
Figure 2B:
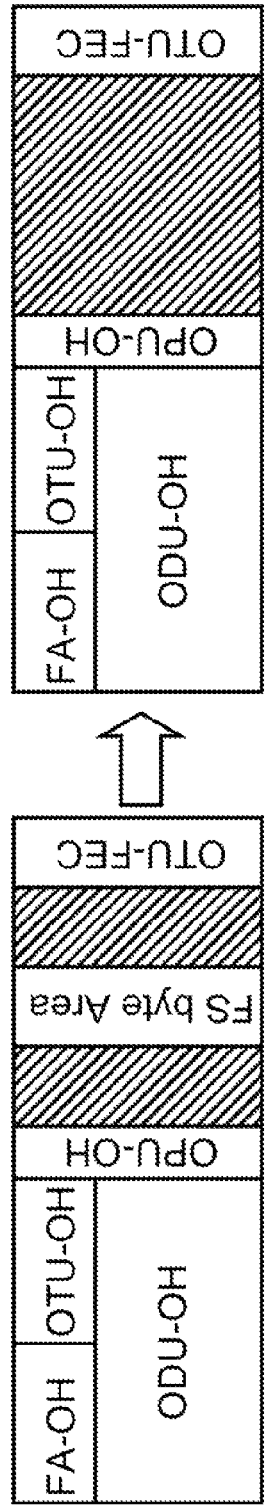
Figure 2C:
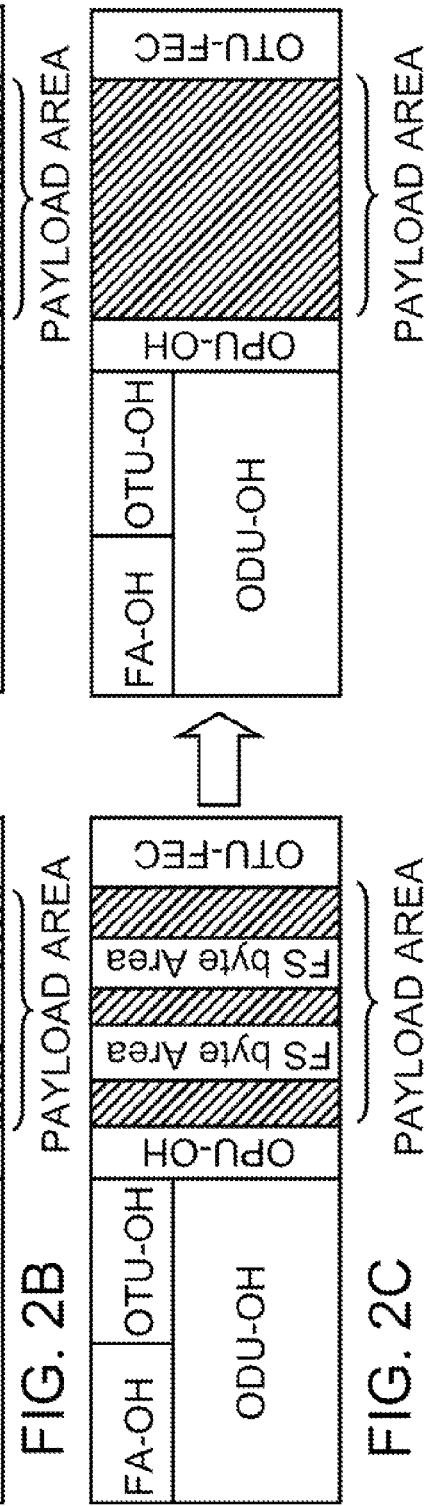

An optical transmission method performed by the optical transmission device according to the second embodiment will be described. FIGS. 2A, 2B, and 2C are diagrams for explaining the optical transmission method performed by the optical transmission device 10 according to the second embodiment. As illustrated in FIG. 2A, the optical transmission device 10 is coupled, via a WDM (Wavelength Division Multiplexing) network 11, to another optical transmission device (TRPN: Transponder) 10-1 which stores client data in the OTU frame. Further, the optical transmission device 10 is coupled, via a WDM network 12, to another optical transmission device (REG: Regenerator) 10-2 which relays the OTU frame. The client data includes, for example, the SDH (Synchronous Digital Hierarchy) frame and the Ethernet (registered trademark) frame.

When the OTU frame is input from the WDM network 11, the optical transmission device 10 determines whether or not the FS byte area for storing fixed data is inserted in the OTU frame. For example, if the data value stored in an OH (Overhead) area of the OTU frame is a predetermined value, the optical transmission device 10 determines that the FS byte area is inserted in the OTU frame.

Then, if the optical transmission device 10 determines that the FS byte area is not inserted in the OTU frame, the optical transmission device 10 outputs the OTU frame as it is to the WDM network 12. Meanwhile, if the optical transmission device 10 determines that the FS byte area is inserted in the OTU frame as illustrated in FIGS. 2B and 2C, the optical transmission device 10 converts the FS byte area into the payload area and outputs the OTU frame including the converted payload area. As illustrated in FIG. 2C, a plurality of FS byte areas may be inserted in a single OTU frame.

Then, the optical transmission device 10 switches the clock frequency used as the reference in the output of the OTU frame including the converted payload area from the clock frequency corresponding to the WDM network 11 to the clock frequency corresponding to the WDM network 12, to which the OTU frame is to be output.

Thereby, the optical transmission device 10 may convert the transmission rate of the OTU frame between the input-side WDM network 11 and the output-side WDM network 12. For example, if the transmission rate of the input-side WDM network 11 is higher than the transmission rate of the output-side WDM network 12, the optical transmission device 10 is capable of reducing the transmission rate of the OTU frame from the input-side transmission rate to the output-side transmission rate.

Figure 3:
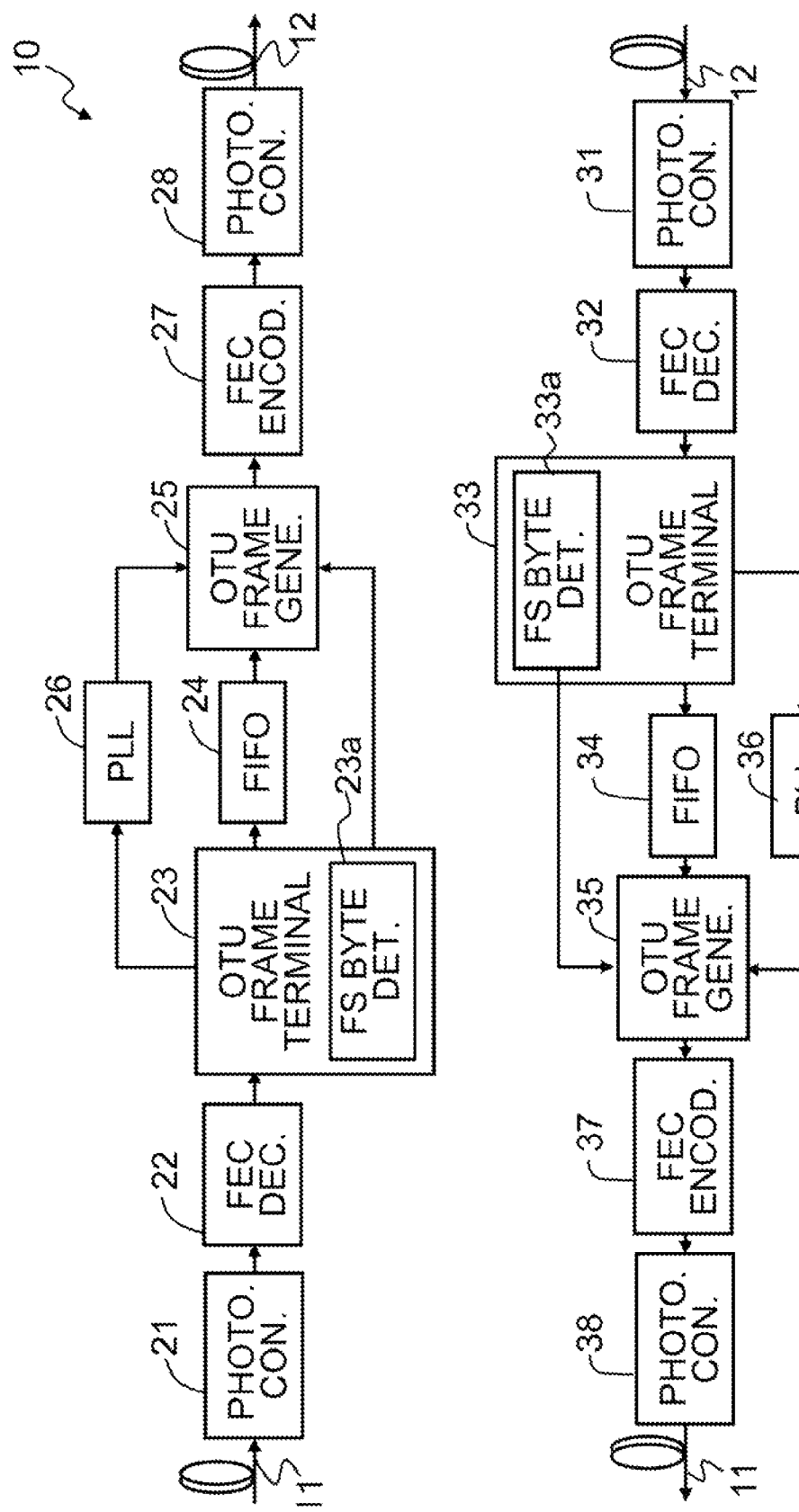
FIG. 3 is a block diagram illustrating a configuration of the optical transmission device according to the second embodiment.

Subsequently, a configuration of the optical transmission device 10 according to the second embodiment will be described. FIG. 3 is a block diagram illustrating the configuration of the optical transmission device 10 according to the second embodiment. The WDM networks 11 and 12 illustrated in FIG. 3 correspond to the WDM networks 11 and 12 illustrated in FIG. 2A, respectively.

The optical transmission device 10 includes a photoelectric convertor 21, an FEC (Forward Error Correction) decoder 22, an OTU frame terminal 23, and a FIFO (First-In First-Out) unit 24. The optical transmission device 10 further includes an OTU frame generator 25, a PLL (Phase Locked Loop) unit 26, an FEC encoder 27, and a photoelectric convertor 28. The optical transmission device 10 further includes a photoelectric convertor 31, an FEC decoder 32, an OTU frame terminal 33, and a FIFO unit 34. The optical transmission device 10 further includes an OTU frame generator 35, a PLL unit 36, an FEC encoder 37, and a photoelectric convertor 38. The above-described processing units 31 to 38 are similar in configuration to the processing units 21 to 28, respectively, and thus description thereof will be omitted.

The photoelectric convertor 21 converts the OTU frame input from the WDM network 11 from the optical signal into the electrical signal, and outputs the converted OTU frame to the FEC decoder 22. The FEC decoder 22 decodes an FEC code added to the OTU frame, and outputs the FEC-decoded OTU frame to the OTU frame terminal 23.

The OTU frame terminal 23 identifies the start position of the OTU frame, and corrects an error of the OTU frame by using the decoded FEC code. Then, the OTU frame terminal 23 outputs the error-corrected OTU frame to the PLL unit 26 and the FIFO unit 24.

Further, the OTU frame terminal 23 includes an FS byte determiner 23a. The FS byte determiner 23a determines whether or not the FS byte area for storing fixed data is inserted in the OTU frame. Specifically, the FS byte determiner 23a determines whether or not the data value stored in the OH area of the OTU frame is a predetermined value, to thereby determine whether or not the FS byte area is inserted in the OTU frame. The FS byte determiner 23a is an example of the determiner 2 illustrated in FIG. 1.

Figure 4:
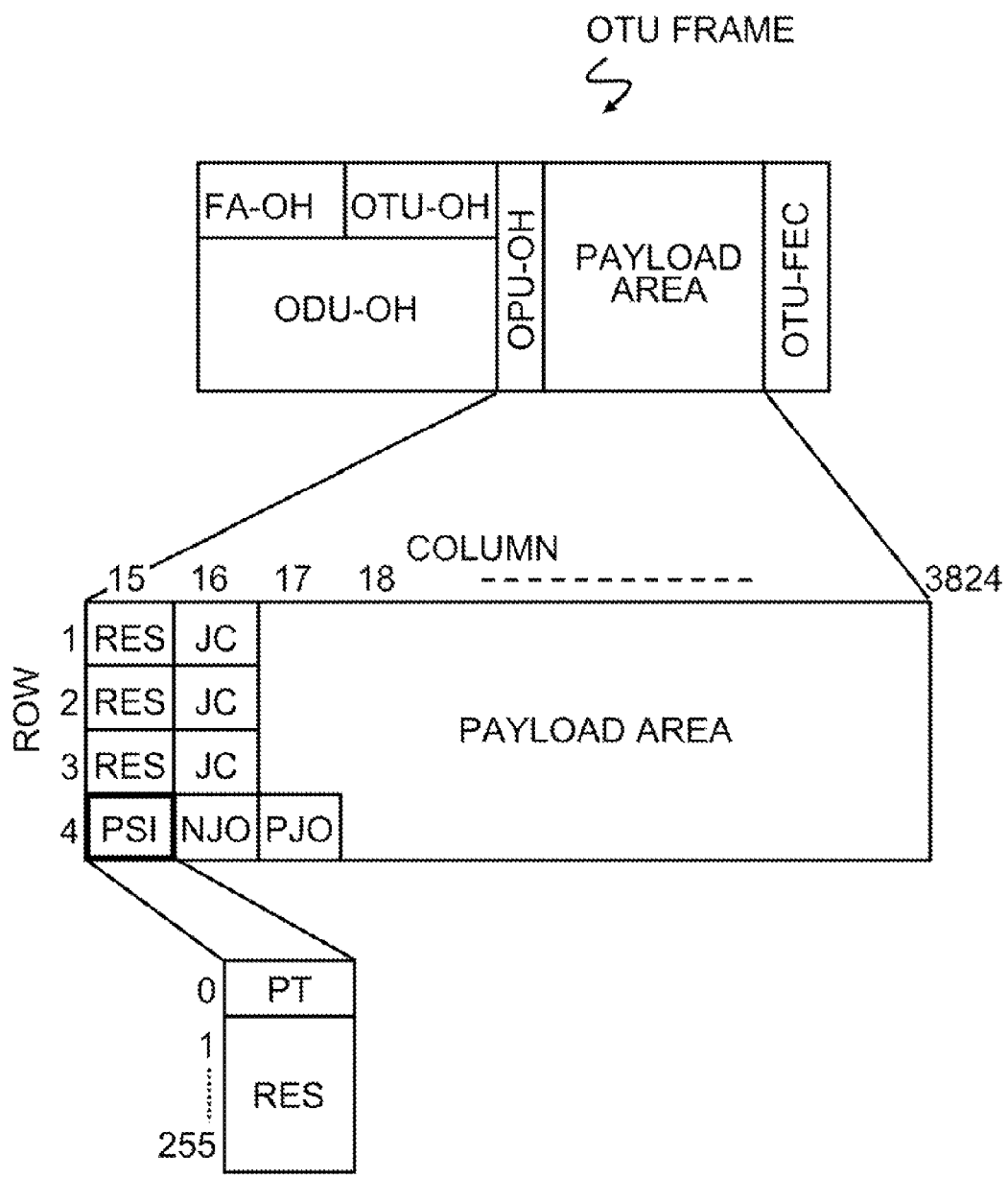
FIG. 4 is a diagram for explaining processing performed by an FS byte determiner.

Herein, the processing performed by the FS byte determiner 23a will be specifically described. FIG. 4 is a diagram for explaining the processing performed by the FS byte determiner 23a. As illustrated in the drawing, the FS byte determiner 23a determines whether or not the determination target position of the OTU frame is the start position of a PSI (Payload Structure Identifier) area defined in an OPU-OH (Optical channel Payload Unit-Overhead) area of the OTU frame. Herein, the PSI area refers to an area for storing a variety of data values indicating what kinds of data are stored in the payload area.

Then, if the determination target position of the OTU frame is the start position of the PSI area, the FS byte determiner 23a determines whether or not a PT (Payload Type) value stored at the start position of the PSI area is "02" or "03." Herein, the PT value refers to a data value indicating whether or not the FS byte area is inserted in the payload area. The PT value of "02" or "03" indicates that the FS byte area is inserted in the payload area of the OTU frame.

Then, if the PT value is "02" or "03," the FS byte determiner 23a outputs to the OTU frame generator 25 the determination result indicating that the FS byte area is inserted in the payload area of the OTU frame.

Meanwhile, if the determination target position of the OTU frame is not the start position of the PSI area, or if the PT value is neither "02" nor "03," the FS byte determiner 23a does not output the determination result indicating that the FS byte area is inserted in the payload area.

A RES (Reservation) area illustrated in FIG. 4 refers to an unused area. Further, a JC (Justification Control) area refers to an area for storing a stuff byte used in a stuffing process for adjusting the amount of client data in the OTU frame. Further, an NJO (Negative Justification Opportunity) byte area refers to an area for storing overflowing client data in the event of overflow from the payload area. Further, a PJO (Positive Justification Opportunity) byte area refers to an area in which a stuff byte is inserted in the event of underflow from the payload area.

Returning to the description of FIG. 3, the FIFO unit 24 temporarily accumulates the OTU frame to switch the clock of the OTU frame input from the OTU frame terminal 23 to the clock of the WDM network 12.

The OTU frame generator 25 reads the OTU frame accumulated in the FIFO unit 24, and stores a variety of operation management information in the OH area of the read OTU frame to thereby generate a new OTU frame. Further, upon receipt from the FS byte determiner 23a of the determination result indicating that the FS byte area is inserted in the payload area, the OTU frame generator 25 converts the FS byte area of the generated OTU frame into the payload area, and outputs a resultant OTU frame to the FEC encoder 27.

Meanwhile, if the OTU frame generator 25 does not receive from the FS byte determiner 23a the determination result indicating that the FS byte area is inserted in the payload area, the OTU frame generator 25 outputs the generated OTU frame as it is to the FEC encoder 27. Further, the OTU frame generator 25 outputs the generated OTU frame to the FEC encoder 27 in accordance with the clock frequency input from the PLL unit 26 described later. The OTU frame generator 25 is an example of the convertor 3 illustrated in FIG. 1.

The PLL unit 26 synchronizes the clock of the OTU frame input from the OTU frame terminal 23 with the clock of the OTU frame output from the OTU frame generator 25 to the FEC encoder 27. Further, if the FS byte area of the OTU frame is converted into the payload area by the OTU frame generator 25, the PLL unit 26 switches the clock frequency for outputting the OTU frame including the converted payload area to the clock frequency of the WDM network 12. Meanwhile, if the OTU frame is output as it is from the OTU frame generator 25, the PLL unit 26 does not switch and retains the clock frequency for outputting the OTU frame. The PLL unit 26 is an example of the switch 4 illustrated in FIG. 1.

The FEC encoder 27 adds an FEC code to the OTU frame input from the OTU frame generator 25 to thereby code the OTU frame, and outputs the coded OTU frame to the photoelectric convertor 28. The photoelectric convertor 28 converts the OTU frame input from the FEC encoder 27 from the electrical signal to the optical signal, and outputs the converted OTU frame to the WDM network 12.

Each of the photoelectric convertor 21, the FEC decoder 22, the OTU frame terminal 23, the FIFO unit 24, the OTU frame generator 25, the PLL unit 26, the FEC encoder 27, and the photoelectric convertor 28 described above is an electronic circuit. Herein, as an example of the electronic circuit, an integrated circuit such as an ASIC (Application Specific Integrated Circuit) and an FPGA (Field Programmable Gate Array), a CPU (Central Processing Unit), an MPU (Micro Processing Unit), or the like may be employed.

Figure 5:
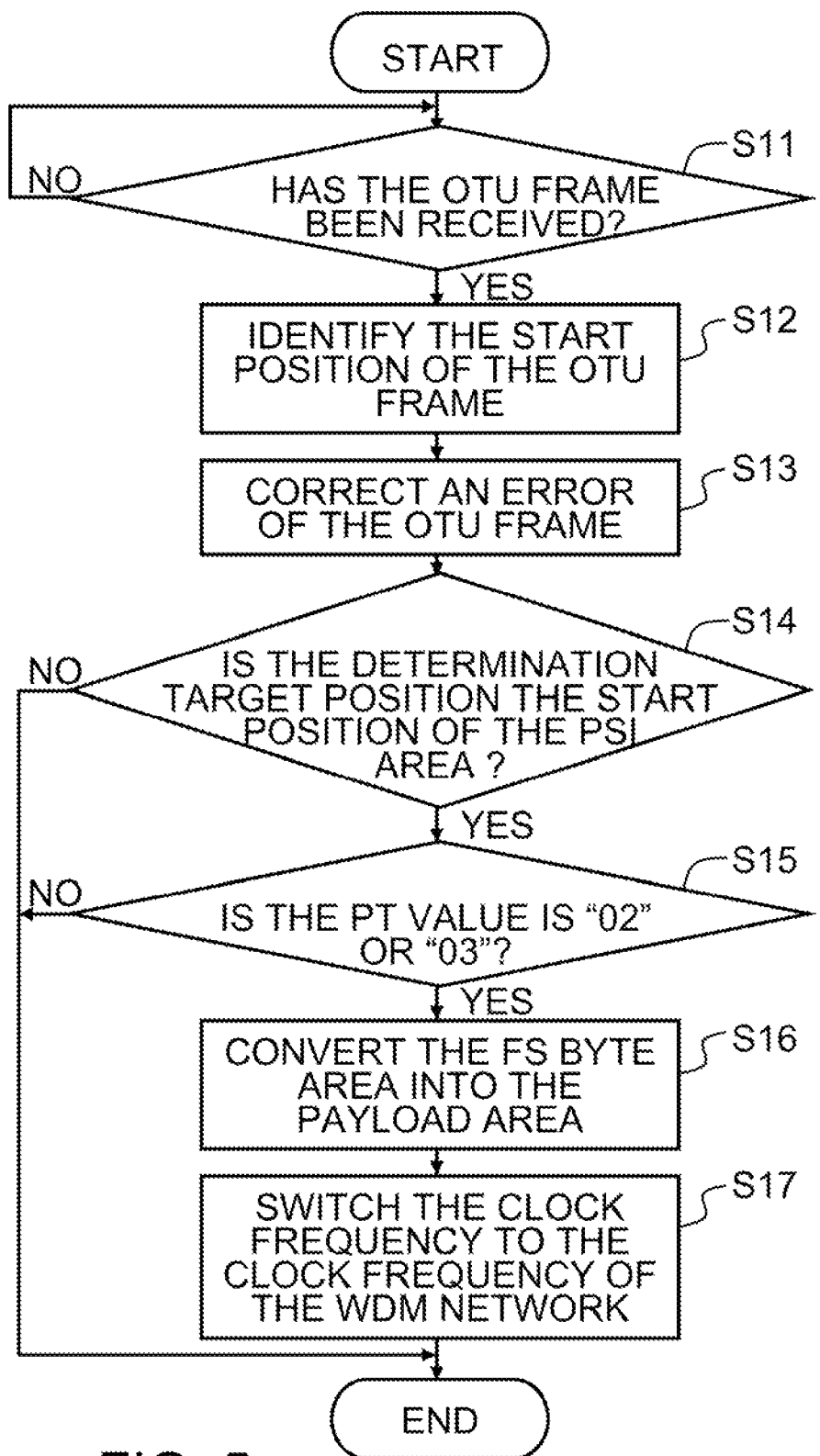
FIG. 5 is a flowchart illustrating a processing procedure performed by the optical transmission device according to the second embodiment.

Subsequently, a processing procedure performed by the optical transmission device 10 according to the second embodiment will be described. FIG. 5 is a flowchart illustrating the processing procedure performed by the optical transmission device 10 according to the second embodiment. As illustrated in FIG. 5, upon receipt of the OTU frame from the WDM network 11 (YES at Operation S11), the optical transmission device 10 identifies the start position of the OTU frame (Operation S12), and corrects an error of the OTU frame by using a decoded FEC code (Operation S13).

Then, the optical transmission device 10 determines whether or not the determination target position of the OTU frame is the start position of the PSI area defined in the OPU-OH area of the OTU frame (Operation S14). If the optical transmission device 10 determines that the determination target position of the OTU frame is the start position of the PSI area (YES at Operation S14), the optical transmission device 10 determines whether or not the PT value stored at the start position of the PSI area is "02" or "03" (Operation S15). That is, the optical transmission device 10 determines whether or not the PT value, which is a data value stored in the OH area of the OTU frame, is a predetermined value, to thereby determine whether or not the FS byte area is inserted in the payload area of the OTU frame.

Then, if it is determined that the PT value is "02" or "03" (YES at Operation S15), it is assumed that the FS byte area is inserted in the payload area. Therefore, the optical transmission device 10 converts the FS byte area of the OTU frame into the payload area (Operation S16). Then, the optical transmission device 10 switches the clock frequency for outputting the OTU frame including the converted payload area to the clock frequency of the WDM network 12, to which the OTU frame is to be output (Operation S17).

Meanwhile, if the determination target position of the OTU frame is not the start position of the PSI area (NO at Operation S14), or if the PT value stored at the start position of the PSI area is neither "02" nor "03" (NO at Operation S15), the optical transmission device 10 completes the processing.

As described above, the optical transmission device 10 according to the second embodiment converts the FS byte area inserted in the payload area of the OTU frame into the payload area. Then, the optical transmission device 10 switches the clock frequency used as the reference in the output of the OTU frame including the converted payload area from the clock frequency of the input-side WDM network 11 to the clock frequency of the output-side WDM network 12. That is, the optical transmission device 10 may convert the transmission rate of the OTU frame between the input side and the output side. Thus, even in the connection between networks having different transmission rates, there is not need to connect two devices in back-to-back connection. Therefore, the optical transmission device 10 according to the second embodiment may create, with a simple configuration, an optical communication network wherein a variety of transmission rates is available.

Further, if the PT value as a data value stored in the OH area of the OTU frame is a predetermined value, the optical transmission device 10 according to the second embodiment determines that the FS byte area is inserted in the payload area of the OTU frame. Therefore, the optical transmission device 10 according to the second embodiment may determine the insertion of the FS byte area without directly monitoring the payload area of the OTU frame. Accordingly, it may be possible to reduce the throughput in determining the insertion of the FS byte area.

In the present embodiment, description has been made of the example in which the optical transmission device is applied to the regenerator device that relays data between different networks. However, the optical transmission device may also be applied to a transponder device that converts the OTU frame into client data. In this case, the OTU frame generators 25 and 35 illustrated in FIG. 3 may be replaced as required by processing units that generate the client data, and the FEC encoders 27 and 37 may be replaced as required by processing units that perform bypass processing.

[Third Embodiment]

In the above-described second embodiment, description has been made of the example in which it is determined that the FS byte area is inserted in the payload area of the OTU frame if the PT value stored in the OH area of the OTU frame is a predetermined value. However, it may be determined that the FS byte area is inserted in the payload area of the OTU frame, if a predetermined position in the payload area of the OTU frame is vacant. In a third embodiment, therefore, description will be made of an example in which, if a predetermined position in the payload area of the OTU frame is vacant, it is determined that the FS byte area is inserted in the payload area of the OTU frame.

Figure 6:
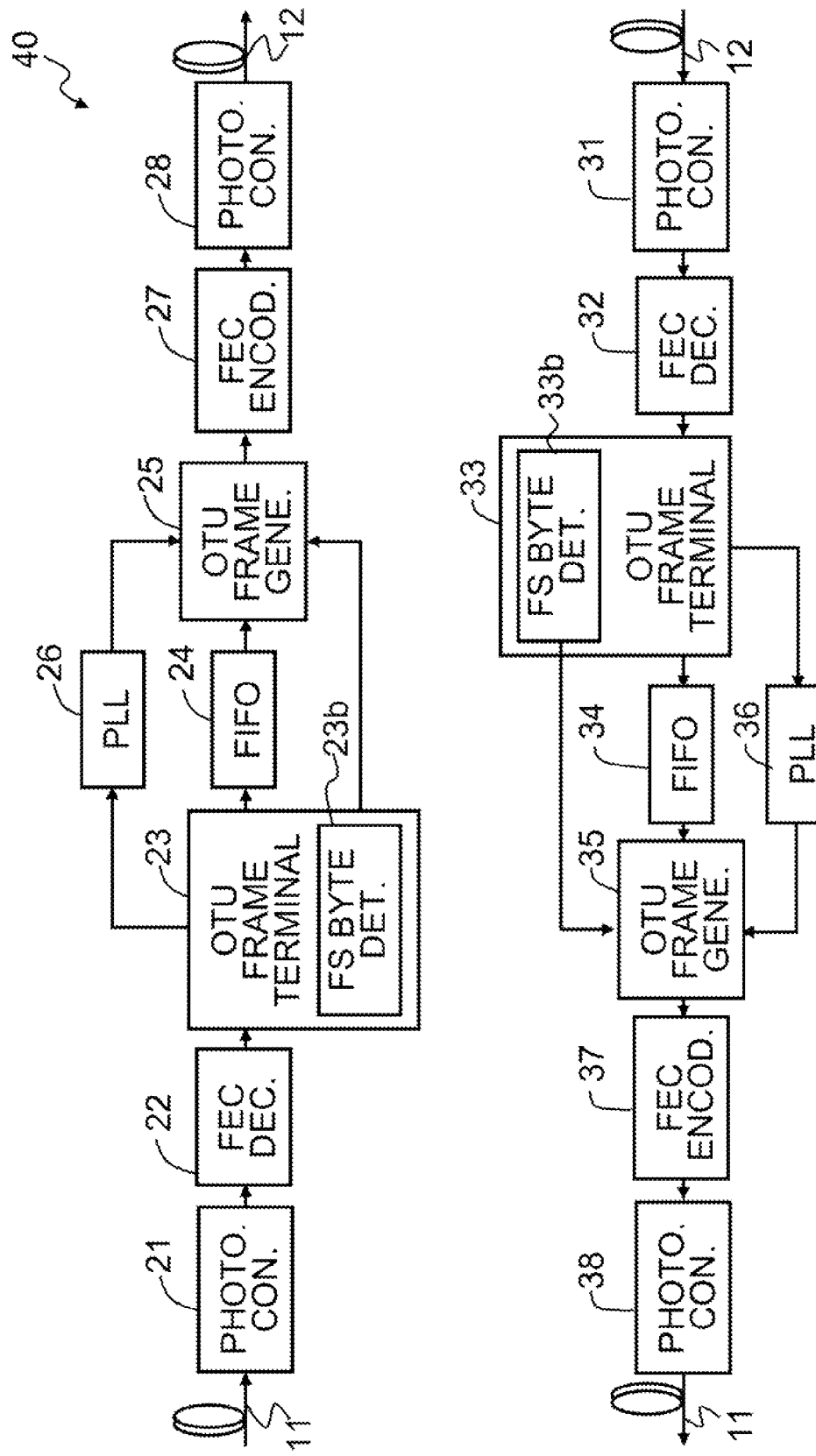
FIG. 6 is a block diagram illustrating a configuration of an optical transmission device according to a third embodiment.

A configuration of an optical transmission device 40 according to the third embodiment will be described. FIG. 6 is a block diagram illustrating the configuration of the optical transmission device 40 according to the third embodiment. In the following, components similar to the constituent components already described in the second embodiment will be designated by the same reference numerals, and detailed description thereof will be omitted. As illustrated in FIG. 6, the optical transmission device 40 includes FS byte determiners 23*b* and 33*b* in place of the FS byte determiners 23*a* and 33*a* illustrated in FIG. 3. The FS byte determiner 33*b* is similar in configuration to the FS byte determiner 23*b*, and thus description thereof will be omitted.

The FS byte determiner 23*b* determines whether or not the FS byte area for storing fixed data is inserted in the payload area of the OTU frame. Specifically, the FS byte determiner 23*b* determines whether or not a predetermined position in the payload area of the OTU frame is vacant, to thereby determine whether or not the FS byte area is inserted in the payload area of the OTU frame. For example, it is now assumed that a position in the payload area of the OTU frame corresponding to a column number of N has previously been defined as the insertion position for inserting therein the FS byte area. In this case, the FS byte determiner 23*b* determines whether or not the previously defined insertion position of the FS byte area is vacant.

Then, if the predetermined position in the payload area of the OTU frame is vacant, the FS byte determiner 23*b* outputs to the OTU frame generator 25 the determination result indicating that the FS byte area is inserted in the payload area. For example, if the previously defined insertion position of the FS byte area is vacant, the FS byte determiner 23*b* outputs to the OTU frame generator 25 the determination result indicating that the FS byte area is inserted in the payload area.

If the determination target position of the OTU frame is not the predetermined position in the payload area, or if the predetermined position in the payload area is not vacant, the FS byte determiner 23*b* does not output the determination result indicating that the FS byte area is inserted in the payload area.

Figure 7:
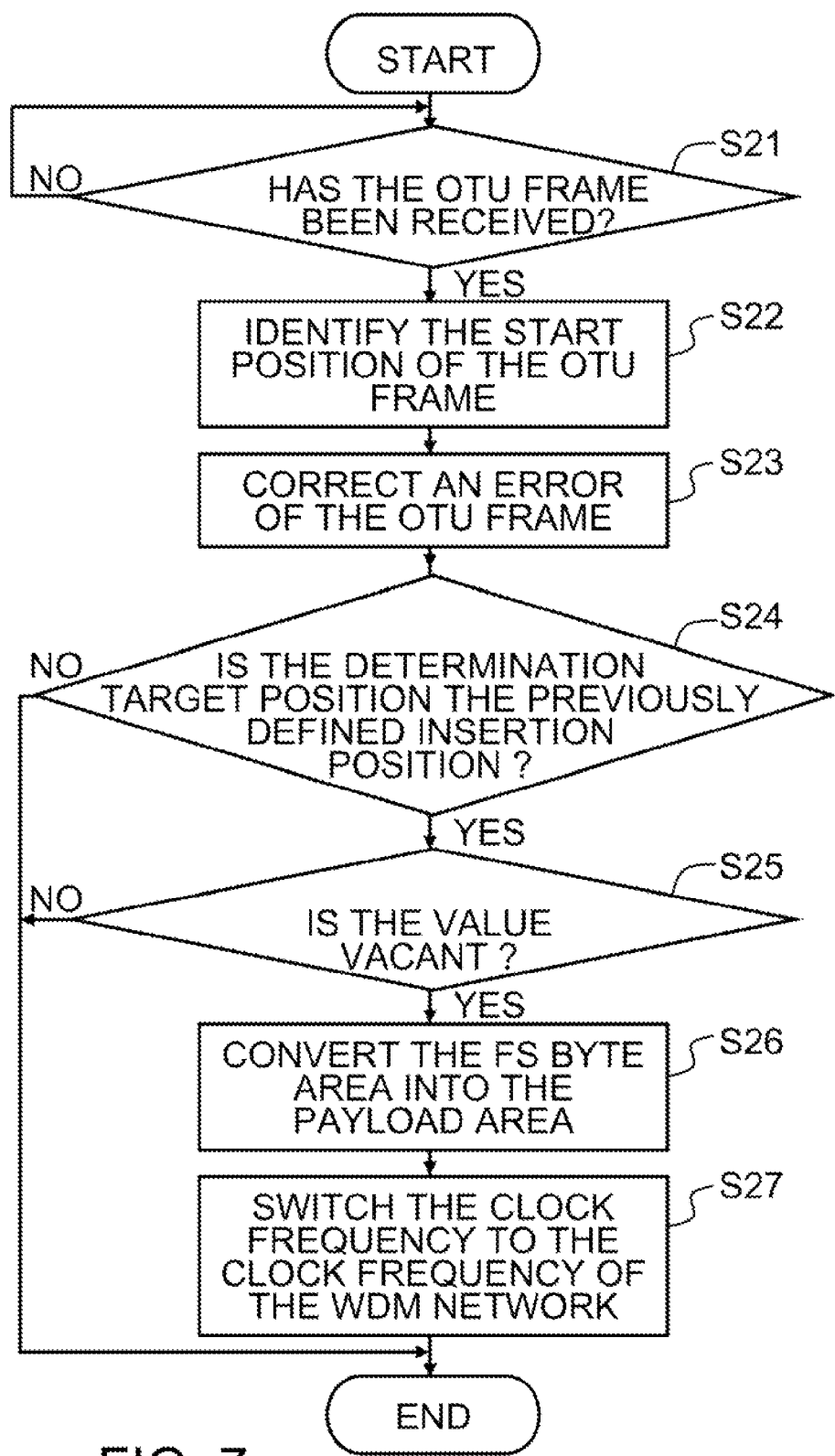
FIG. 7 is a flowchart illustrating a processing procedure performed by the optical transmission device according to the third embodiment.

Subsequently, a processing procedure performed by the optical transmission device 40 will be described. FIG. 7 is a flowchart illustrating the processing procedure performed by the optical transmission device 40 according to the third embodiment. As illustrated in FIG. 7, upon receipt of the OTU frame from the WDM network 11 (YES at Operation S21), the optical transmission device 40 identifies the start position of the OTU frame (Operation S22), and corrects an error of the OTU frame by using a decoded FEC code (Operation S23).

Then, the optical transmission device 40 determines whether or not the determination target position of the OTU frame is the previously defined insertion position of the FS byte area (Operation S24). If the optical transmission device 40 determines that the determination target position of the OTU frame is the previously defined insertion position of the FS byte area (YES at Operation S24), the optical transmission device 40 determines whether or not the previously defined insertion position of the FS byte area is vacant ("0") (Operation S25). That is, the optical transmission device 40 determines whether or not the insertion position of the FS byte area previously defined in the payload area of the OTU frame is vacant, to thereby determine whether or not the FS byte area is inserted in the payload area of the OTU frame.

Then, if it is determined that the insertion position of the FS byte area is vacant (YES at Operation S25), it is assumed that the FS byte area is inserted in the payload area. Therefore, the optical transmission device 40 converts the FS byte area of the OTU frame into the payload area (Operation S26). Then, the optical transmission device 40 switches the clock frequency for outputting the OTU frame including the converted payload area to the clock frequency of the WDM network 12, to which the OTU frame is to be output (Operation S27).

Meanwhile, if the determination target position of the OTU frame is not the previously defined insertion position of the FS byte area (NO at Operation S24), or if the insertion position of the FS byte area is not vacant (NO at Operation S25), the optical transmission device 40 completes the processing.

As described above, the optical transmission device 40 according to the third embodiment determines whether or not the insertion position of the FS byte area previously defined in the payload area of the OTU frame is vacant, to thereby determine whether or not the FS byte area is inserted in the payload area of the OTU frame. Therefore, even if an erroneous PT value is stored in the OH area of the OTU frame, the optical transmission device 40 according to the third embodiment may reliably determine whether or not the FS byte area is inserted in the payload area of the OTU frame.

[Fourth Embodiment]

In the above-described second embodiment, description has been made of the example in which the clock frequency used as the reference in the output of the OTU frame is switched from the clock frequency corresponding to the input-side network to the clock frequency corresponding to the output-side network. However, the configuration may be modified to detect the clock frequency corresponding to the input-side network, and to switch the clock frequency to the clock frequency of the output-side network previously associated with the detected clock frequency. In a fourth embodiment, therefore, description will be made of an example in which the clock frequency of the input-side network is detected, and in which the clock frequency used as the reference in the output of the OTU frame is switched to the clock frequency of the output-side network previously associated with the detected clock frequency.

Figure 8:
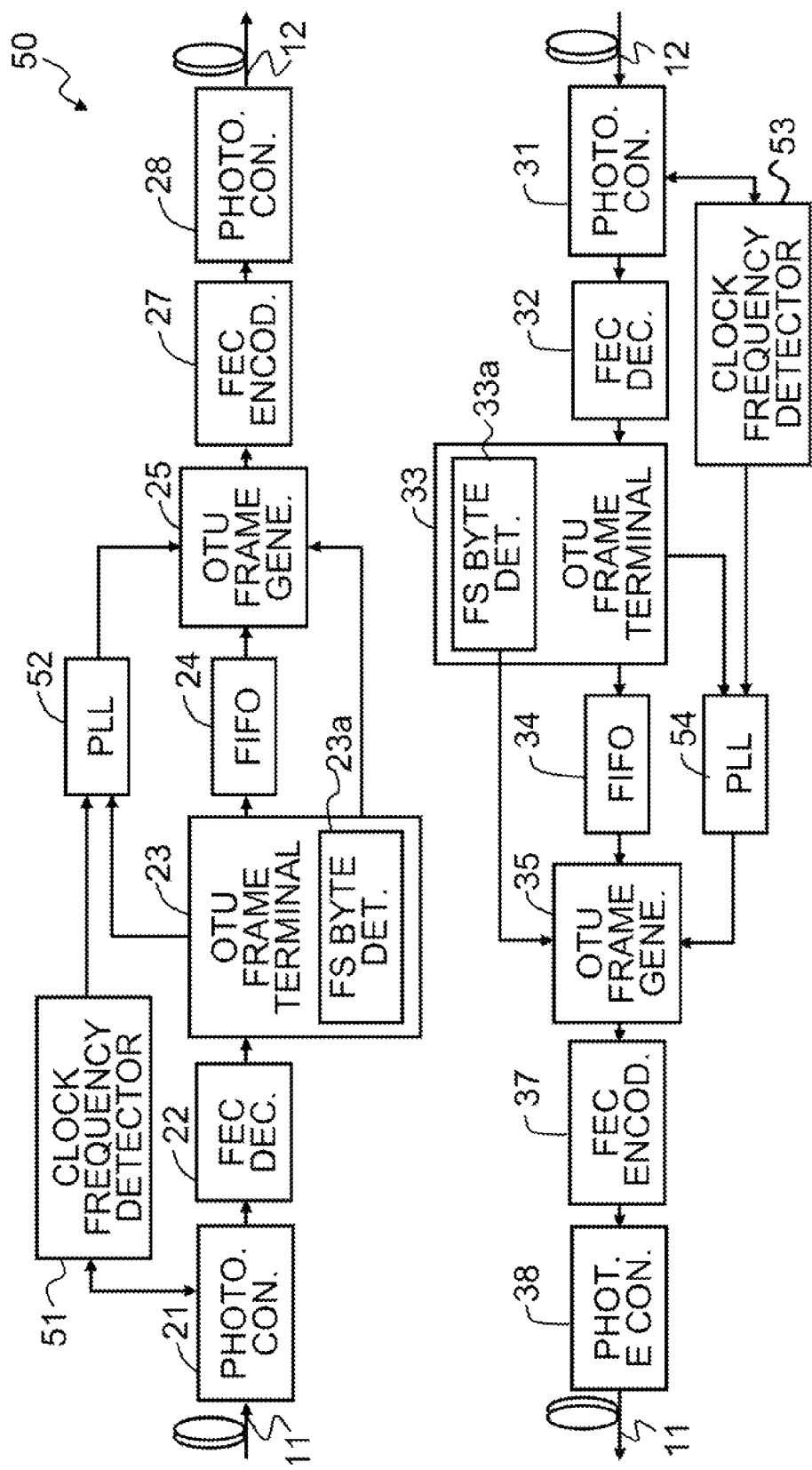
FIG. 8 is a block diagram illustrating a configuration of an optical transmission device according to a fourth embodiment.

A configuration of an optical transmission device 50 according to the fourth embodiment will be described with reference to FIG. 8 which is a block diagram illustrating the configuration of the optical transmission device 50 according to the fourth embodiment. Components similar to the constituent components already described in the second embodiment will be designated by the same reference numerals, and detailed description thereof will be omitted. As illustrated in FIG. 8, the optical transmission device 50 newly includes a clock frequency detector 51 and a PLL unit 52 in place of the PLL unit 26 illustrated in FIG. 3. Further, the optical transmission device 50 newly includes a clock frequency detector 53 and a PLL unit 54 in place of the PLL unit 36 illustrated in FIG. 3. The clock frequency detector 53 and the PLL unit 54 are similar in configuration to the clock frequency detector 51 and the PLL unit 52, respectively, and thus description thereof will be omitted.

The clock frequency detector 51 detects the clock frequency of the WDM network 11, i.e., the input-side network from which the OTU frame is input. For example, the clock frequency detector 51 changes, by minute amounts, a reference clock input to a CDR (Clock Data Recovery) circuit provided in the photoelectric convertor 21, to thereby detect the clock frequency for locking the CDR circuit as the clock frequency of the WDM network 11. Then, the clock frequency detector 51 informs the PLL unit 52 of the detected clock frequency of the WDM network 11.

The PLL unit 52 performs processing similar to the processing performed by the PLL unit 26 illustrated in FIG. 3. In addition, upon receipt of the clock frequency of the WDM network 11 from the clock frequency detector 51, the PLL unit 52 refers to an internal table, and thereby reads the clock frequency of the WDM network 12 previously associated with the clock frequency of the WDM network 11. Then, the PLL unit 52 switches the clock frequency for outputting the OTU frame to the clock frequency of the WDM network 12 read from the internal table.

As described above, the optical transmission device 50 according to the fourth embodiment detects the clock frequency of the input-side network, and switches the clock frequency used as the reference in the output of the OTU frame to the clock frequency of the output-side network previously associated with the detected clock frequency. Therefore, the optical transmission device 50 according to the fourth embodiment may switch at high speed the transmission rate of the frame between the input side and the output side.

[Fifth Embodiment]

In the above-described second to fourth embodiments, description has been made of the example in which the clock of the OTU frame and the clock of the client data are synchronous with each other. However, the stuffing process might be performed when the clock of the OTU frame and the clock of the client data are asynchronous with each other. In a fifth embodiment, therefore, description will be made of an example in which the stuffing process is performed when the clock of the OTU frame and the clock of the client data are asynchronous with each other.

Description will be first made of a reason for performing the stuffing process when the clock of the OTU frame and the clock of the client data are asynchronous with each other. When the clock of the OTU frame and the clock of the client data are asynchronous with each other, frequency deviation occurs between the clock frequency of a WDM network that transmits the OTU frame and the clock frequency of a client network that transmits the client data. If there is the frequency deviation therebetween, the client data tends to overflow or underflow from the payload area of the OTU frame.

Figure 9:
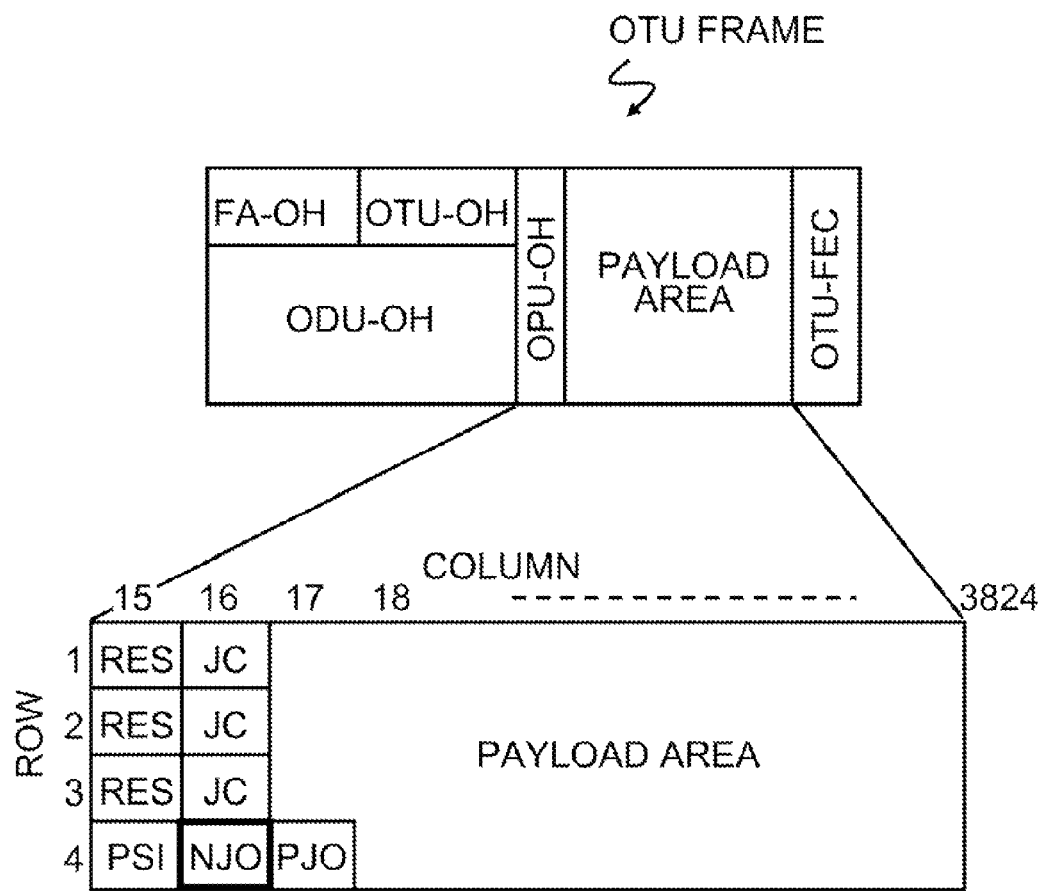
FIG. 9 is a diagram for explaining a stuffing process performed by an optical transmission device according to a fifth embodiment.
Figure 10A:
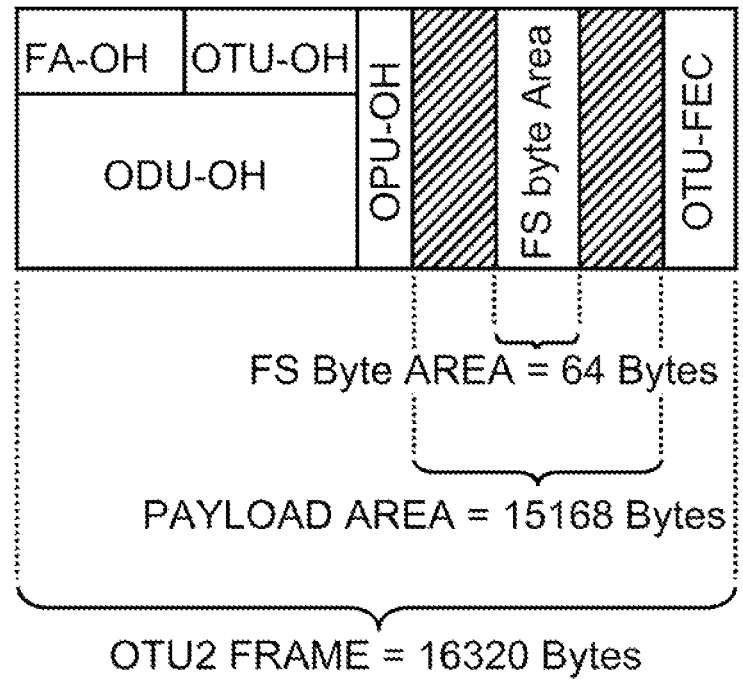
FIGS. 10A and 10B are diagrams for explaining the stuffing process performed by the optical transmission device according to the fifth embodiment.
Figure 10B:
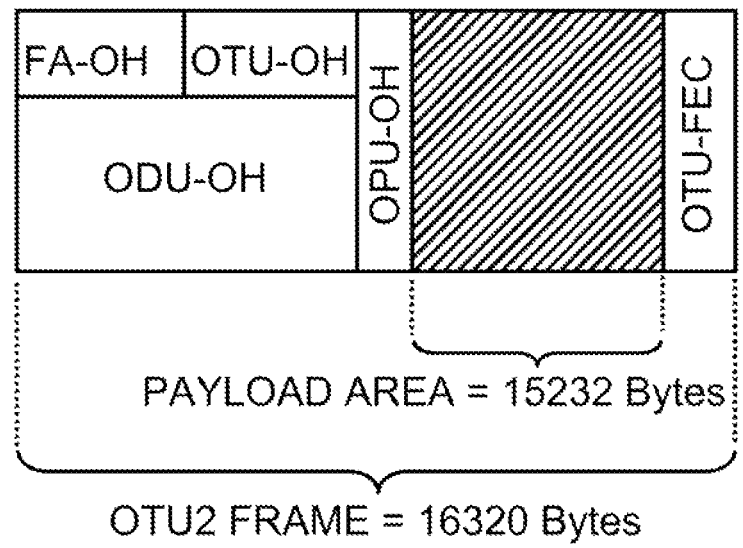
Figure 11:
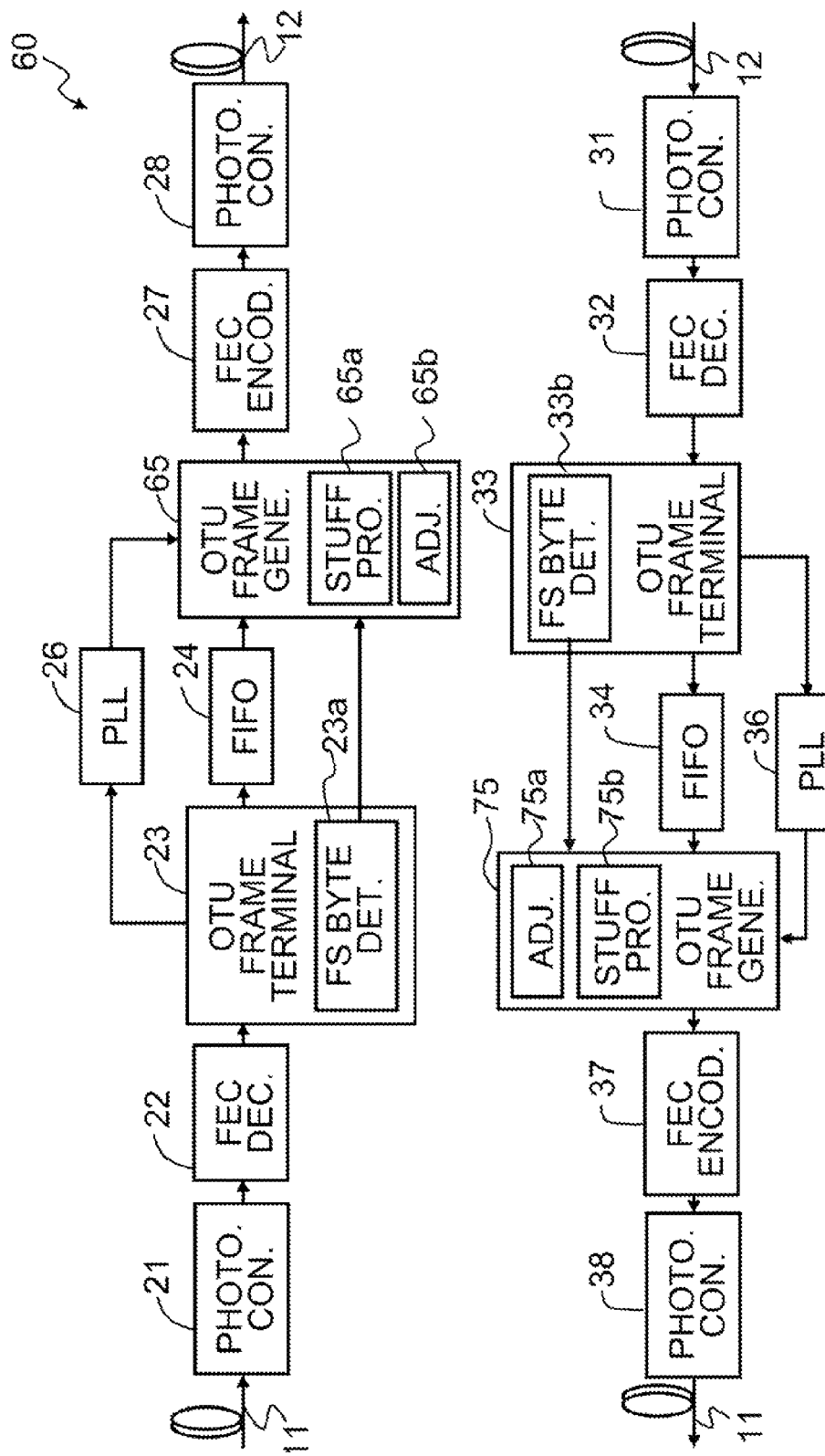
FIG. 11 is a block diagram illustrating a configuration of the optical transmission device according to the fifth embodiment.

To absorb the frequency deviation and thereby eliminate the overflow or underflow, therefore, the optical transmission device performs the stuffing process for adjusting the amount of client data input to the payload area of the OTU frame. Specific description will be made with reference to FIGS. 9, 10A, and 10B. FIGS. 9, 10A, and 10B are diagrams for explaining the stuffing process performed by an optical transmission device 60 (FIG. 11). Herein, as an example of the stuffing process, description will be made of a negative stuffing process, which is a stuffing process for increasing the amount of client data in the OTU frame in the event of overflow of client data.

The NJO byte area is a stuff byte area for storing overflowing client data in the event of overflow of client data. As illustrated in FIG. 9, the NJO byte area is defined in the OH area of the OTU frame. The optical transmission device 60 stores in the NJO byte area the client data overflowing from the payload area of the OTU frame owing to frequency deviation.

Herein, the proportion of client data stored in the NJO byte area of a single OTU frame is different between the OTU frame having no FS byte area inserted therein and the OTU frame having an FS byte area inserted therein. The proportion of client data stored in the NJO byte area of a single OTU frame is hereinafter referred to as "inserted stuff ratio." When converting the FS byte area inserted in the OTU frame into the payload area, the optical transmission device 60 adjusts the amount of client data stored in the NJO byte area illustrated in FIG. 9 with an inserted stuff ratio corresponding to the OTU frame having no FS byte area inserted therein.

Herein, an example of a method of calculating the inserted stuff ratio will be described with reference to FIGS. 10A and 10B. It is assumed herein that the client data is OC192 data corresponding to a transmission rate of 9.95328 Gbps, and that the OTU frame is the OTU2 frame corresponding to a transmission rate of 10.709 Gbps. It is also assumed that the clock frequency of the client network for transmitting the OC192 data deviates from the reference value by +20 ppm while the clock frequency of the WDM network for transmitting the OTU2 frame deviates from the reference value by −20 ppm, i.e., the frequency deviation is 40 ppm.

Description will be first made of a method of calculating an inserted stuff ratio corresponding to the OTU2 frame having an FS byte area inserted therein. As illustrated in FIG. 10A, the number of bytes in the OTU2 frame is 16320, while the number of bytes in the payload area is 15168. Further, the reference transmission rate of the OTU2 frame having an FS byte area inserted therein is 10.706 Gbps. Therefore, an inserted stuff ratio C1 corresponding to the OTU2 frame having an FS byte area inserted therein is calculated by the following formula.

$$16320/(10.709-20)=(15168+C1)/(9.95328+20) \quad (1)$$

The above-described formula (1) is expanded as follows.

$$C1=\{16320\times(9.95328+20)/(10.709-20)\}-15168=0.607 \text{ (bytes/frame)} \quad (2)$$

Subsequently, description will be made of a method of calculating an inserted stuff ratio corresponding to the OTU2 frame having no FS byte area inserted therein. As illustrated in FIG. 10B, the number of bytes in the OTU2 frame is 16320, and the number of bytes in the payload area is increased by the number of bytes in the FS byte area (64 bytes), i.e., 15168+64=15232. Further, the reference transmission rate of the OTU2 frame having no FS byte area inserted therein is 10.664 Gbps. Therefore, an inserted stuff ratio C2 corresponding to the OTU2 frame having no FS byte area inserted therein is calculated by the following formula.

$$16320/(10.664-20)=(15232+C2)/(9.95328+20) \quad (3)$$

The above-described formula (3) is expanded as follows.

$$C2=\{16320\times(9.95328+20)/(10.664-20)\}-15232=0.609 \text{ (bytes/frame)} \quad (4)$$

As is obvious from the above-described formulae (2) and (4), the inserted stuff ratio corresponding to the OTU2 frame having no FS byte area inserted therein and the inserted stuff ratio corresponding to the OTU2 frame having an FS byte area inserted therein are different from each other. When converting the FS byte area inserted in the OTU2 frame into the payload area, the optical transmission device 60 adjusts the amount of client data stored in the NJO byte area with the inserted stuff ratio C2, in the formula (4), corresponding to the OTU2 frame having no FS byte area inserted therein.

Subsequently, a configuration of the optical transmission device 60 according to the fifth embodiment will be described. FIG. 11 is a block diagram illustrating the configuration of the optical transmission device 60 according to the fifth embodiment. In the following, components similar to the constituent components already described in the second embodiment will be designated by the same reference numerals, and detailed description thereof will be omitted. As illustrated in FIG. 11, the optical transmission device 60 newly includes an OTU frame generator 65 in place of the OTU frame generator 25 illustrated in FIG. 3. Further, the optical transmission device 60 newly includes an OTU frame generator 75 in place of the OTU frame generator 35 illustrated in FIG. 3. The OTU frame generator 75 is similar in configuration to the OTU frame generator 65, and thus description thereof will be omitted.

The OTU frame generator 65 performs processing similar to the processing performed by the OTU frame generator 25 illustrated in FIG. 3. In addition, the OTU frame generator 65 performs the stuffing process when the clock of the OTU frame and the clock of the client data are asynchronous with each other. Specifically, the OTU frame generator 65 includes a stuffing processor 65a and an adjuster 65b.

If there is frequency deviation between the clock frequency of the WDM network 11 and the clock frequency of the client network, the stuffing processor 65a stores in the NJO byte area the client data overflowing from the payload area of the OTU frame. When the OTU frame generator 65 converts the FS byte area into the payload area, the adjuster 65b adjusts the amount of client data stored in the NJO byte area or the PJO byte area with the inserted stuff ratio corresponding to the OTU frame having no FS byte area inserted therein.

As described above, the optical transmission device 60 according to the fifth embodiment performs the stuffing process when the clock of the OTU frame and the clock of the client data are asynchronous with each other. Further, when converting the FS byte area inserted in the OTU frame into the payload area, the optical transmission device 60 adjusts the amount of client data stored in the NJO byte area with the inserted stuff ratio corresponding to the OTU frame having no FS byte area inserted therein. Therefore, even if the clock of the OTU frame and the clock of the client data are asynchronous with each other, the optical transmission device 60 according to the fifth embodiment may prevent the overflow or underflow of client data from the payload area of the OTU frame.

Embodiments of the present invention have been described above. The present invention can also be implemented in a variety of different embodiments, as well as in the embodiments described above, within the scope of technical concepts set forth in the claims.

For example, among the processes described in the above-described embodiments, all or a part of the processes described as automatically performed can also be manually performed. Further, information including processing procedures, control procedures, specific names, and a variety of data and parameters disclosed in the above description and the drawings can be arbitrarily changed, except as otherwise specified.

Further, the constituent components of the devices illustrated in the drawings are functionally conceptual, and are not necessarily required to be physically configured as illustrated in the drawings. That is, specific forms of distribution and integration of the devices are not limited to those illustrated in the drawings. Thus, all or a part of the devices can be functionally or physically distributed and integrated in arbitrary units in accordance with various loads, states of use, and so forth. Further, all or an arbitrary part of the processing functions performed by the devices can be realized by a CPU and a program analyzed and executed by the CPU, or can be realized as hardware by a wired logic.

The processes described in the present embodiments can be realized when a previously prepared program is executed by a computer, such as a personal computer and a workstation. The program can be distributed via a network, such as the Internet. Further, the program can also be executed when the program recorded in a computer-readable recording medium, such as a hard disk, an FD (Flexible Disk), a CD-ROM (Compact Disk-Read Only Memory), an MO (Magneto-Optical disk), and a DVD (Digital Versatile Disk), is read from the recording medium by a computer.

All examples and conditional language recited herein are intended for pedagogical purposes to aid the reader in understanding the present invention and the concepts contributed by the present inventors to furthering the art, and are to be construed as being without limitation to any of the configurations of the examples in the present specification and such specifically recited examples and conditions related to the indication of the superiority and inferiority of the present invention. Although the embodiments of the present invention have been described in detail, it should be understood that various changes, substitutions, and alterations could be made hereto without departing from the spirit and scope of the present invention.

What is claimed is:

1. An optical transmission device for receiving first data from a first network and transmitting second data corresponding to the first data to a second network comprising:
   a determiner configured to determine whether a frame includes a fixed stuff byte area or not when the frame is received from the first network, the frame including a payload area for storing client data, the fixed stuff byte area being for storing fixed data;
   a convertor configured to convert the fixed stuff byte area into the payload area when the determiner determines that the frame includes the fixed stuff byte area; and
   a switch configured to switch a clock frequency from a first clock frequency used in the first network to a second clock frequency used in the second network when the frame including the converted fixed stuff byte area is output to the second network on the basis of the second clock frequency as a reference.

2. The optical transmission device according to claim 1, wherein the determiner determines that the frame includes the fixed stuff byte area when a data value stored in an overhead area of the frame is a specific value.

3. The optical transmission device according to claim 1, wherein the determiner determines that the frame includes the fixed stuff byte area when a predetermined position in the payload area of the frame is vacant.

4. The optical transmission device according to claim 1, further comprising a detector configured to detect a clock frequency used in the first network, wherein the switch switches the clock frequency from the detected clock frequency to a third clock frequency used in the second network, the third clock frequency corresponding to the detected clock frequency.

5. The optical transmission device according to claim 2, further comprising a detector configured to detect a clock frequency used in the first network, wherein the switch switches the clock frequency from the detected clock frequency to a third clock frequency used in the second network, the third clock frequency corresponding to the detected clock frequency.

6. The optical transmission device according to claim 3, further comprising a detector configured to detect a clock frequency used in the first network, wherein the switch switches the clock frequency from the detected clock frequency to a third clock frequency used in the second network, the third clock frequency corresponding to the detected clock frequency.

7. The optical transmission device according to claim 1, further comprising:
   a stuff processor configured to store the client data in a stuff byte area provided in the frame when there is a frequency deviation between the first clock frequency and a third clock frequency of the second network as a client network to which the client data is transmitted; and
   an adjuster configured to adjust an amount of the client data to be stored in the stuff byte area with a specific rate when the fixed stuff byte area is converted to the payload byte area by the convertor, the specific rate being a proportion of data overflowing from the payload byte area to the frame in which the fixed stuff byte area is not inserted.

8. The optical transmission device according to claim 2, further comprising:
   a stuff processor configured to store the client data in a stuff byte area provided in the frame when there is a frequency deviation between the first clock frequency and a third clock frequency of the second network as a client network to which the client data is transmitted; and
   an adjuster configured to adjust an amount of the client data to be stored in the stuff byte area with a specific rate when the fixed stuff byte area is converted to the payload byte area the convertor, the specific rate being a proportion of data overflowing from the payload byte area to the frame in which the fixed stuff byte area is not inserted.

9. The optical transmission device according to claim 3, further comprising:
   a stuff processor configured to store the client data in a stuff byte area provided in the frame when there is a frequency deviation between the first clock frequency and a third clock frequency of the second network as a client network to which the client data is transmitted; and
   an adjuster configured to adjust an amount of the client data to be stored in the stuff byte area with a specific rate when the fixed stuff byte area is converted to the payload byte area by the convertor, the specific rate being a proportion of data overflowing from the payload byte area to the frame in which the fixed stuff byte area is not inserted.

10. The optical transmission device according to claim 4, further comprising:
    a stuff processor configured to store the client data in a stuff byte area provided in the frame when there is a frequency deviation between the first clock frequency and a third clock frequency of the second network as a client network to which the client data is transmitted; and
    an adjuster configured to adjust an amount of the client data to be stored in the stuff byte area with a specific rate when the fixed stuff byte area is converted to the payload byte area by the convertor, the specific rate being a proportion of data overflowing from the payload byte area to the frame in which the fixed stuff byte area is not inserted.

11. An optical transmission method comprising:
    determining whether a frame includes a fixed stuff byte area or not when the frame is received from a first network, the frame including a payload area for storing client data, the fixed stuff byte area being for storing fixed data;
    converting the fixed stuff byte area into the payload area when the determining determines that the frame includes the fixed stuff byte area; and
    switching a clock frequency from a first clock frequency used in the first network to a second clock frequency used in a second network when the frame including the converted fixed stuff byte area is output to the second network on the basis of the second clock frequency as a reference.

* * * * *